United States Patent
Evans (10) Patent No.: US 9,832,700 B2
(45) Date of Patent: *Nov. 28, 2017

(54) HIGH-SPEED WAN TO WIRELESS LAN GATEWAY

(71) Applicant: Qurio Holdings, Inc., Peterborough, NH (US)

(72) Inventor: Gregory M. Evans, Raleigh, NC (US)

(73) Assignee: Qurio Holdings, Inc., Peterborough, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/338,478

(22) Filed: Oct. 31, 2016

(65) Prior Publication Data

US 2017/0048778 A1 Feb. 16, 2017

Related U.S. Application Data

(63) Continuation of application No. 14/512,750, filed on Oct. 13, 2014, now Pat. No. 9,485,804, which is a
(Continued)

(51) Int. Cl.
*H04W 36/22* (2009.01)
*H04L 29/06* (2006.01)
(Continued)

(52) U.S. Cl.
CPC ........ *H04W 36/22* (2013.01); *G06F 12/0813* (2013.01); *G06F 21/105* (2013.01); *H04L 29/06503* (2013.01); *H04L 47/25* (2013.01); *H04L 63/10* (2013.01); *H04L 67/06* (2013.01); *H04L 67/2852* (2013.01);
(Continued)

(58) Field of Classification Search
CPC .... H04W 88/16; H04L 47/25; H04L 12/2834; H04L 12/4014; H04L 12/40091; H04L 12/40097; H04L 12/242; H04L 2012/5618; H04L 29/06224; H04L 29/06231; H04L 65/1025; H04L 25/05; H04L 41/083;
(Continued)

(56) References Cited

U.S. PATENT DOCUMENTS 6,317,831 B1 * 11/2001 King ................... H04L 63/0428
380/223
6,704,317 B1 * 3/2004 Dobson ............... H04L 27/2608
370/401

(Continued)

*Primary Examiner* — Warner Wong (57) ABSTRACT

A gateway interconnecting a high speed Wide Area Network (WAN) and a lower speed Wireless Local Area Network (WLAN) is provided. The high speed WAN is preferably connected to the gateway via a Fiber-to-the Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Thereafter, the data is moved from the non-secure data cache to a secure data cache and thereafter transmitted to an appropriate user device in the WLAN at the lower data rate of the WLAN.

20 Claims, 4 Drawing Sheets

Related U.S. Application Data continuation of application No. 13/329,992, filed on Dec. 19, 2011, now Pat. No. 8,879,567, which is a continuation of application No. 11/475,360, filed on Jun. 27, 2006, now Pat. No. 8,102,863.

(51) Int. Cl.

| | |
|---|---|
| *H04L 29/08* | (2006.01) |
| *H04W 88/16* | (2009.01) |
| *G06F 12/0813* | (2016.01) |
| *G06F 21/10* | (2013.01) |
| *H04L 12/825* | (2013.01) |
| *H04L 12/815* | (2013.01) |
| *H04L 12/40* | (2006.01) |
| *H04W 84/12* | (2009.01) |

(52) U.S. Cl.
CPC ....... *H04W 88/16* (2013.01); *G06F 2212/154* (2013.01); *G06F 2212/60* (2013.01); *G06F 2212/62* (2013.01); *G06F 2221/2141* (2013.01); *H04L 12/4013* (2013.01); *H04L 47/22* (2013.01); *H04L 2463/101* (2013.01); *H04W 84/12* (2013.01)

(58) Field of Classification Search
CPC ......... H04L 9/00; H04L 9/0819; H04L 63/00; G06F 12/0813; G06F 21/105
USPC ........................................................ 370/401
See application file for complete search history.

(56) References Cited

U.S. PATENT DOCUMENTS

| | | | |
|---|---|---|---|
| 6,875,236 B2 * | 4/2005 | Reiley .................. | A61B 17/15 606/87 |
| 7,500,269 B2 * | 3/2009 | Huotari ................. | H04L 63/08 713/153 |
| 7,987,490 B2 * | 7/2011 | Ansari .................. | G06Q 30/04 725/105 |
| 2001/0023460 A1 * | 9/2001 | Boucher ................. | G06F 5/10 709/250 |
| 2002/0114336 A1 * | 8/2002 | Chow .................... | H04L 12/66 370/401 |
| 2006/0182149 A1 * | 8/2006 | Ramsdale ................ | G06F 1/08 370/516 |
| 2007/0058645 A1 * | 3/2007 | Nannra ................. | H04L 41/046 370/401 |
| 2007/0266134 A1 * | 11/2007 | Shyy .................... | H04W 99/00 709/223 |
| 2010/0020685 A1 * | 1/2010 | Short .................... | H04L 12/14 370/230 |

* cited by examiner

HIGH-SPEED WAN TO WIRELESS LAN GATEWAY

RELATED APPLICATIONS

The present application is a continuation of U.S. application Ser. No. 14/512,750 filed Oct. 13, 2014, which is a continuation of U.S. application Ser. No. 13/329,992 filed Dec. 19, 2011 (now U.S. Pat. No. 8,879,567 issued Nov. 4, 2014,) which is a continuation of U.S. application Ser. No. 11/475,360, filed Jun. 27, 2006 (now U.S. Pat. No. 8,102,863 issued Jan. 24, 2012,) the disclosure of which is hereby incorporated by reference herein in its entirety.

FIELD OF THE INVENTION

The present invention relates to a gateway device and more particularly relates to a gateway device interconnecting a high speed Wide Area Network (WAN) to a lower speed Wireless Local Area Network (WLAN).

BACKGROUND OF THE INVENTION

Historically, residential gateways provided a routing function from an in-home Local Area Network (LAN) to a Wide Area Network (WAN) based Asynchronous Digital Subscriber Line (ADSL) or Data Over Cable Service Interface Specification (DOCSIS) connection. Bandwidth available from the WAN ranged from 200 kbps to 6 Mbps. The LAN side of the gateway was either a single or multiple 10/100 Bt Ethernet connections serving client computers. Eventually, these Ethernet connections were replaced with wireless IEEE 802.11b/a/g LANs operating from 6 to 50 Mbps. The smaller bandwidth capabilities of the WAN versus the LAN kept downstream traffic flow simple in the gateway. Upstream traffic from the LAN to WAN was seldom an issue because users were less sensitive to this bottleneck. A typical upstream bottleneck scenario would be sending an email with a large attachment. In this situation, the Transfer Control Protocol (TCP) service of the gateway would simply throttle the LAN connection to the appropriate speed for the WAN.

With the advent of Fiber-to-the-Home (FTTH) networks, the traditional scenario described above has been reversed. In a FTTH network, a high speed FTTH data connection is provided to the residential gateway. The FTTH data connection provides data rates in the range of 1 to 10 Gbps. In contrast, the proposed IEEE 802.11n standard for wireless LANs provides data rates in the range of 100 to 500 Mbps. As such, the traditional residential gateway architecture will limit overall performance to the wireless LAN bandwidth, thereby negating much of the value of the FTTH connection. Thus, there is a need for an improved residential gateway architecture for interconnecting a high speed WAN to a lower speed wireless LAN.

SUMMARY OF THE INVENTION

The present invention relates to a gateway interconnecting a high speed Wide Area Network (WAN) and a lower speed Wireless Local Area Network (WLAN). The high speed WAN is preferably connected to the gateway via a Fiber-to-the-Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Once inspected by the rule check engine, the data is moved from the non-secure cache to the secure cache and thereafter transmitted to an appropriate user device in the WLAN at a lower data rate of the WLAN.

Prior to transmitting the data, the gateway may also perform additional functions such as, but not limited to, file format conversion, Digital Rights Management (DAM) encoding or decoding, and Data Encryption Standard (DES) encryption or decryption.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
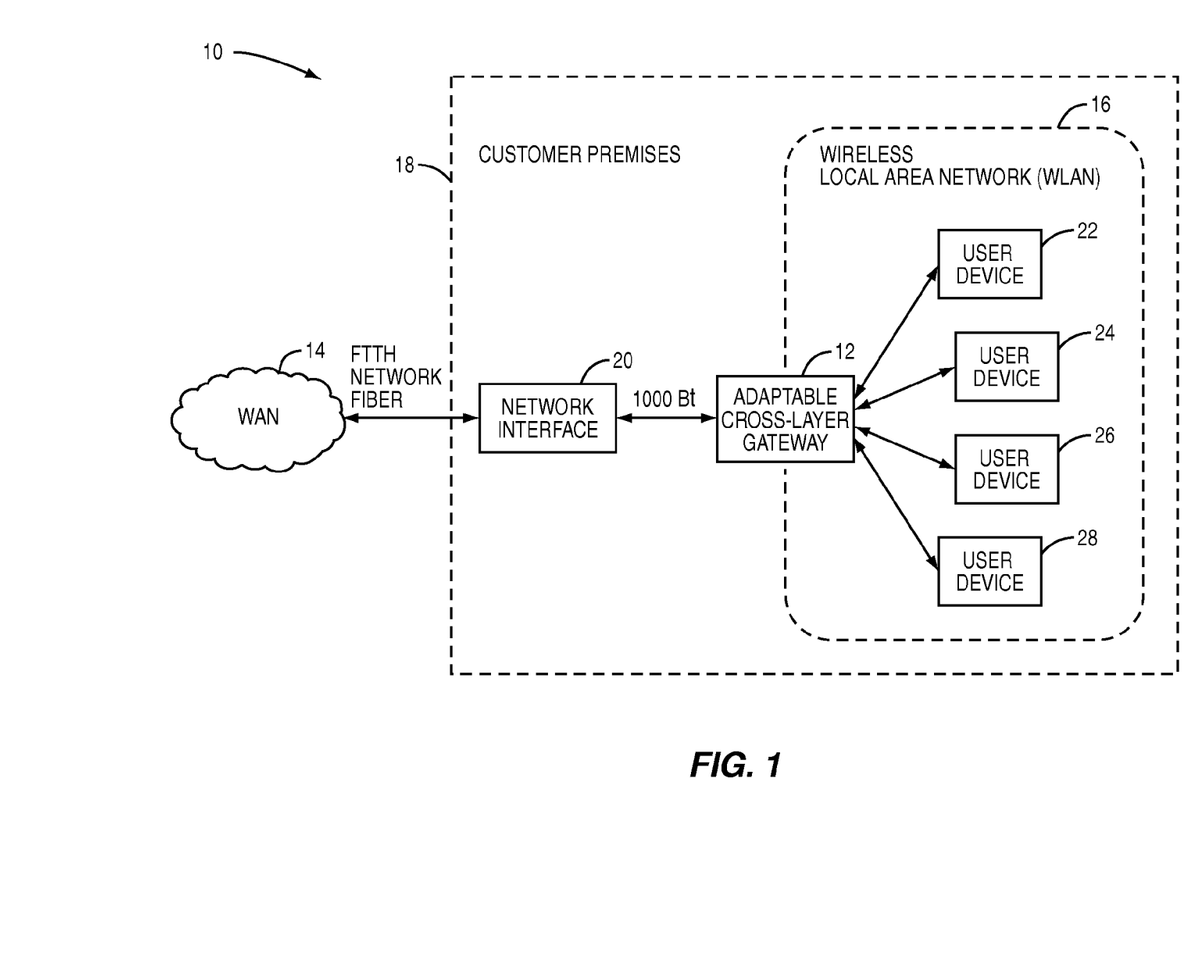
FIG. 1 illustrates a system including an adaptable cross-layer gateway for interconnecting, or bridging, a high speed Wide Area Network (WAN) to a lower speed Wireless Local Area Network (WLAN) according to one embodiment of the present invention.

FIG. 1 illustrates a system 10 including an adaptable cross-layer gateway 12 interconnecting, or bridging, a high speed WAN 14 and a lower speed WLAN 16 according to one embodiment of the present invention. In addition, as discussed below, the gateway 12 offloads data to data caches in order to take advantage of the high data rate provided by the high speed WAN 14. In addition, by using cross-layering techniques, the gateway 12 improves the performance of the WLAN 16 in order to take further advantage of the high speed WAN 14. The gateway 12 may be implemented in hardware or a combination of hardware and software. For example, the gateway 12 may include one or more Application Specific Integrated Circuits (ASICs), one or more Digital Signal Processors (DSPs), one or more Field Programmable Gate Arrays (FPGAs), or the like.

The WAN 14 may be a distributed public access network such as the Internet. Preferably, the WAN 14 provides a Fiber-to-the-Home (FTTH) connection to a customer premises 18, which in this example includes a network interface 20, the gateway 12, and the WLAN 16. FTTH generally refers to a broadband network where a fiber-optic connection is provided to the home. The FTTH connection provides data rates equal to or greater than 1 Gigabit per second (Gbps). For example, the FTTH connection may provide data rates in the range of and including 1 to 10 Gbps. The network interface 20 may be a FTTH modem providing an interface between the FTTH connection and the gateway 12. In this exemplary embodiment, the network interface 20 provides an optical to electrical Gigabit Ethernet connection (1000 Bt) to the gateway 12. It should be noted that while the preferred high speed connection to the WAN 14 is the FTTH connection discussed herein, the present invention is not limited thereto. The gateway 12 of the present invention may be used to interconnect, or bridge, any high speed WAN to a lower speed LAN regardless of the type of connection provided to the WAN. For example, the gateway 12 may interconnect an OC-192 (9.95328 Gbps) or 10 Gigabit Ethernet WAN to a multipart Gigabit Ethernet (1000 Bt) lower speed LAN.

The WLAN 16 may operate, for example, according to one or more of the suite of IEEE 802.11 standards such as the IEEE 802.11a, IEEE 802.11b, IEEE 802.11g, or the proposed IEEE 802.11n standards. The WLAN 16 is formed by the gateway 12 and a number of user devices 22-28 each having a wireless interface. The user devices 22-28 may be, for example, personal computers, Personal Video Recorders (PVRs), Personal Digital Assistants (PDAs), other Internet Protocol (IP) appliances, or the like, or any combination thereof.

Figure 2:
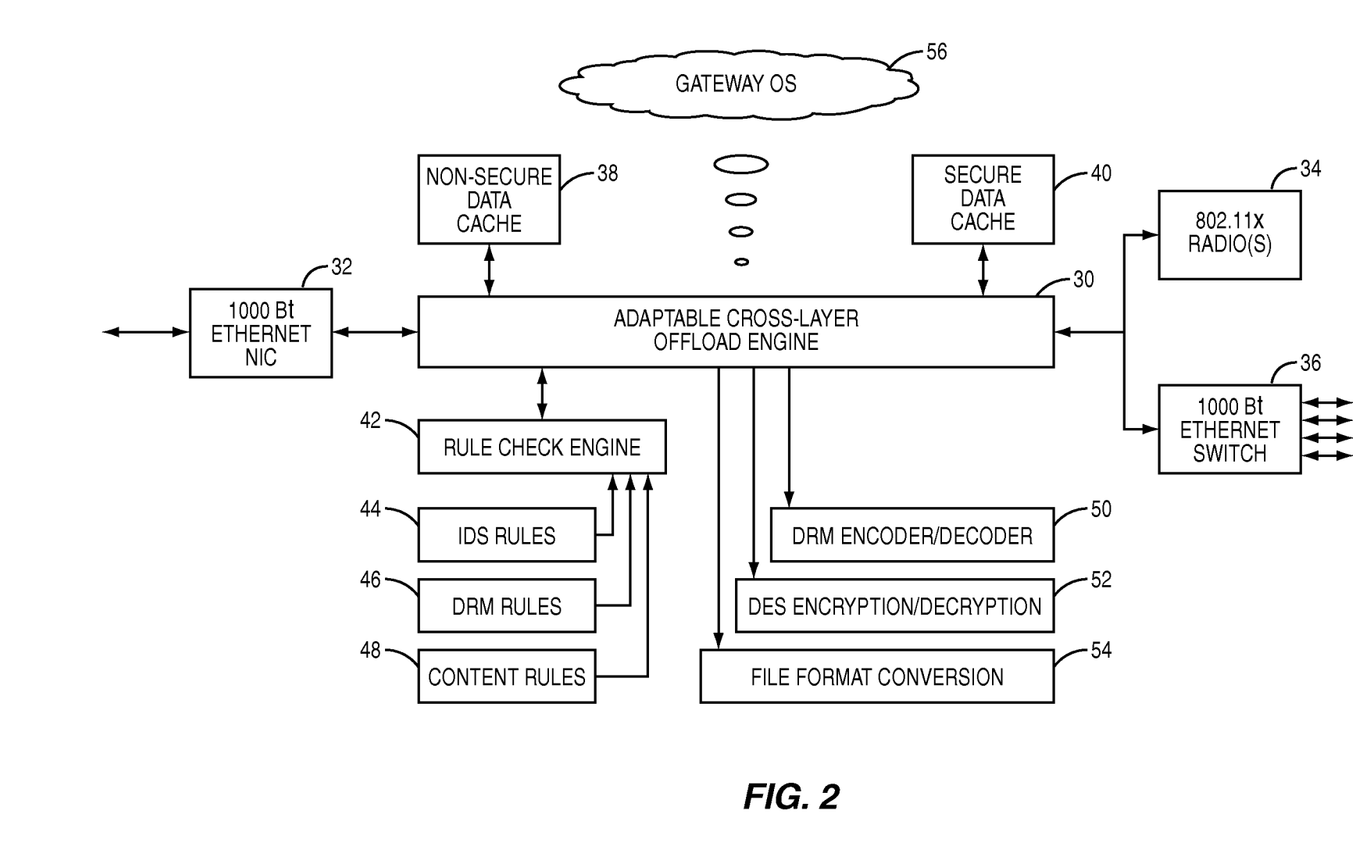
FIG. 2 is a block diagram of the adaptable cross-layer gateway of FIG. 1 according to one embodiment of the present invention.

FIG. 2 is a more detailed block diagram of the gateway 12 according to one embodiment of the present invention. At the heart of the gateway 12 is an adaptable cross-layer offload engine 30 that manages bandwidth, or traffic flow, between the WAN 14 and the WLAN 16. The offload engine 30 utilizes cross-layer functionality and is configurable to adapt to varying conditions in the WLAN 16. The offload engine 30 is preferably implemented in hardware, but may alternatively be implemented in software or a combination of hardware and software.

The offload engine 30 is communicatively coupled to the WAN 14 via, in this example, a Gigabit Ethernet Network Interface Card (NIC) 32, which is connected to the WAN 14 (FIG. 1) via the network interface 20. The NIC 32 may generally be referred to as a high speed network interface. The offload engine 30 is communicatively coupled to the WLAN 16, and more specifically the user devices 22-28 in the WLAN 16, via one or more wireless radios 34. In this example, the wireless radios 34 are IEEE 802.11n wireless radios. However, the present invention is not limited thereto. The gateway 12 may also include an Ethernet switch 36 or the like providing one or more wired connections to additional LAN devices.

The gateway 12 also includes a non-secure data cache 38 and a secure data cache 40. The non-secure and secure data caches 38 and 40 are used to buffer data as needed by the offload engine 30. While illustrated separately, the data caches 38 and 40 may be implemented in a single physical cache where, for example, flags are used to identify secure and non-secure data. The non-secure data cache 38 is used to store received data from the WAN 14 for inspection and processing prior to forwarding the data to the WLAN 16. The non-secure data cache 38 may also be used to buffer large data sets from the WLAN 16 waiting for transmission over the WAN 14. By buffering data in the non-secure data cache 38, the gateway 12 is enabled to take advantage of the full bandwidth provided by the FTTH connection. The secure data cache 40 is used to temporarily store data from the non-secure data cache 38 that has been inspected and cleared for transmission prior to transmission to the user devices 22-28 in the WLAN 16.

A rule check engine 42 operates to inspect the data in the non-secure data cache 38 according to a number of rules, which in this example include Intrusion Detection System (IDS) rules 44, Digital Rights Management (DRM) rules 46, and other general or specific content rules 48. The rule check engine 42 may perform stateless inspection, stateful inspection, or both stateless and stateful inspection. The IDS rules 44 are generally rules for detecting malicious network traffic and may include, for example, typical firewall rules. The DRM rules 46 may be rules for protecting media files, such as videos, songs, and images, stored on the user devices 22-28 within the WLAN 16 when transmitted over the WAN 14. In addition, the DAM rules 46 may include rules for identifying incoming content to be encoded as a security feature to prevent unauthorized viewing of the specified content by, for example, children within the WLAN 16. The content rules 48 may include rules regulating the types of content that may be accessed by the user devices 22-28 within the WLAN 16. In addition, as discussed below, the rule check engine 42 may inspect the data passing through the gateway 12 based on rules for triggering additional functions provided by the gateway 12.

The gateway 12 may also include various additional functional components such as, but not limited to, a DRM encoder/decoder 50, a Digital Encryption System (DES) encryption/decryption function 52, and a file format conversion function 54. The functions 50-54 may be triggered either directly or indirectly by the rule check engine 42 based on associated rules used to inspect data passing through the gateway 12.

The DRM encoder/decoder 50 may be implemented in hardware, software, or a combination of hardware and software, and may be used to protect content transmitted over the WAN 14 from the user devices 22-28 within the WLAN 16. In addition or alternatively, the DRM encoder/decoder 50 may be used in conjunction with firewall technology to create a security feature that prevents unauthorized viewing of specified content on the user devices 22-28. More specifically, in the outgoing direction, the DRM encoder/decoder 50 may operate to encode content leaving the WLAN 16. For example, personal videos, songs, images, or the like stored by the user devices 22-28 may be encoded by the DRM encoder/decoder 50 such that only desired recipients may view or play the content. As for incoming content, the DRAM encoder/decoder 50 may, for example, encode specified types of content from the WAN 14 to prevent unauthorized viewing by, for example, children. License keys could be distributed by the gateway 12 to appropriate user devices 22-28 to unlock the encoded content. It should be noted that the present invention is not limited to DAM encoding or decoding. Other types of encoding and decoding may be used as desired.

The DES encryption/decryption function 52 may be implemented in the wireless radios 34. However, the present invention is not limited thereto. The DES encryption/decryption function 52 operates to provide encryption and decryption of data transmitted over the WLAN 16 as commonly understood in the art. Additionally, DES and DRM may share the same encryption/decryption functions.

The file format conversion function 54 may be implemented in hardware, software, or a combination of hardware and software, and may be used to reduce the size of or otherwise adapt incoming content in order to reduce the bandwidth required to transfer the content to the appropriate user devices 22-28. More specifically, the file format conversion function 54 may convert the content from a first file format to a second file format having reduced bandwidth requirements, reduce the quality of the content, or both. For example, the file format conversion function 54 may convert a Motion Pictures Experts Group (MPEG) Layer 2 (MPEG-2) video file to a MPEG Layer 4 (MPEG-4) video file, thereby reducing the bandwidth required to transfer the video file over the WLAN 16. In addition or alternatively, the file format conversion function 54 may reduce the quality of the content such that the bandwidth required to transfer the content over the WLAN 16 is also reduced. For example, the quality of video content may be reduced by reducing the resolution, bit rate, or frame rate. The file format conversion function 54 may process incoming content as the content is provided to the gateway 12 or after the content is entirely transferred to the gateway 12.

The gateway 12 also includes a gateway operating system (OS) 56, which operates to configure and control the operation of the offload engine 30, the rule check engine 42, and the various functions 50-54. The gateway OS 56 may include client agents loaded, or configured, by the user devices 22-28. Using these client agents, the gateway OS 56 may be configured to, for example, convert all incoming MPEG-2 files to MPEG-4 files for all of the user devices 22-28; convert all incoming MPEG-2 files to MPEG-4 files for the user device 22; convert all incoming MPEG-2 files to AVI files for the user device 24; block all video content to the user device 26; block only Internet Protocol (IP) streaming content to the user device 28; use DRM encoding on all multimedia content and restrict playback to the user device 22; and configure the gateway 12 to immediately cache e-mail with attachments and provide the e-mail and attachments to the appropriate one of the user devices 22-28 over available radio frequency (RF) spectrum using a background operation. The above operations are intended to be exemplary and as such should not be construed to limit the scope of the present invention. These configurations may be implemented by the gateway OS 56 as additional rules for the rule check engine 42.

In operation, when data is received from the WAN 14 via the NIC 32, the offload engine 30 offloads the data into the non-secure data cache 38. While in the non-secure data cache 38, the data is inspected by the rule check engine 42 based on the rules 44-48 and any additional rules from the gateway OS 56 for triggering the functions 50-54. Once the data is cleared for transmission, the data is transferred to the secure data cache 40 where the data remains until transmission to the appropriate user devices 22-28 over the WLAN 16. As for outgoing data, data from the user devices 22-28 in the WLAN 16 is received by the gateway 12. For large data sets, such as large data files, or optionally for all outgoing data, the offload engine 30 offloads the data into the non-secure data cache 38. Once the data is buffered, the data is transmitted over the WAN 14. In one embodiment, the data is buffered to the extent needed to take full advantage of the bandwidth provided by the FTTH connection. However, note that for small data transfers such as, for example, a Hypertext Transfer Protocol (HTTP) request, the gateway 12 may chose not to buffer the data.

Figure 3:
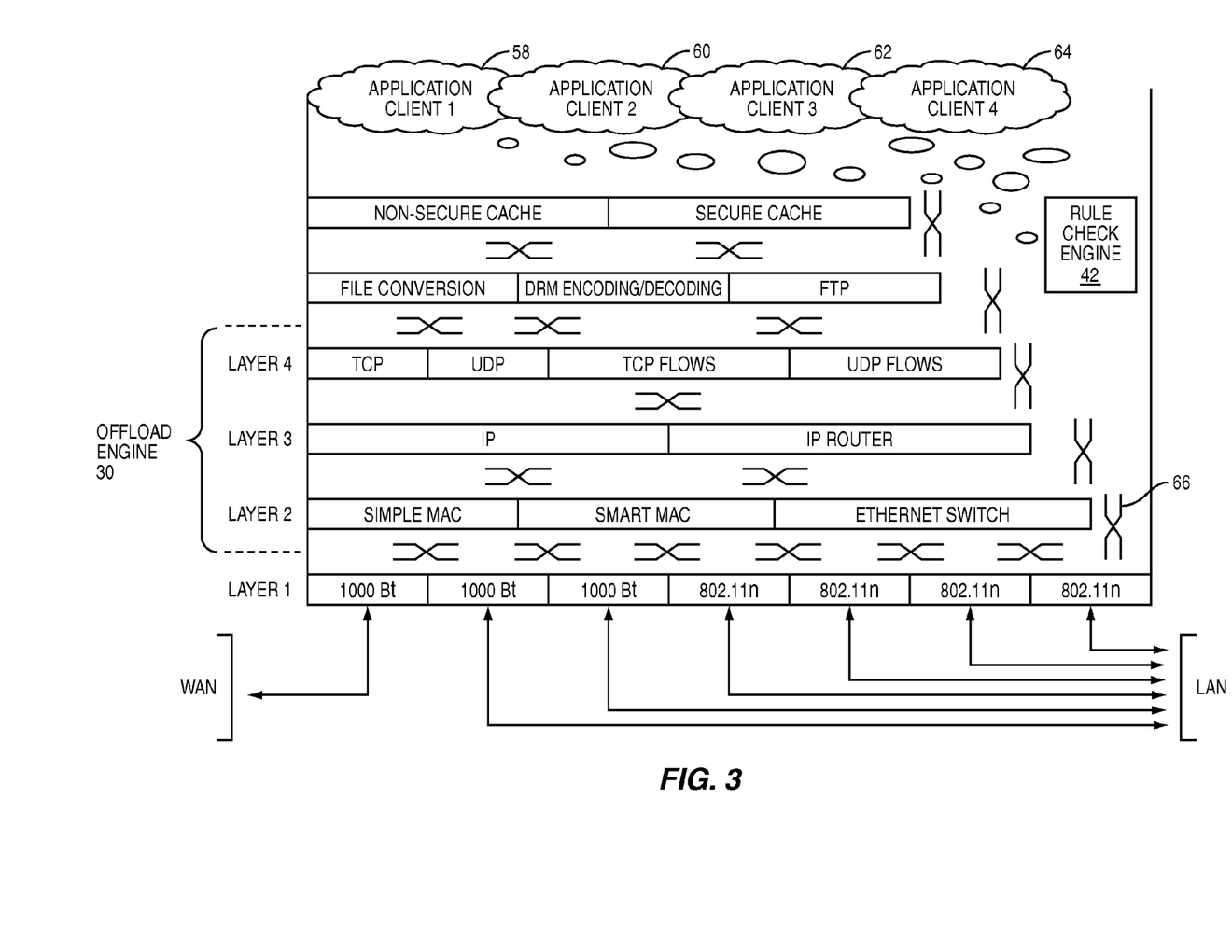
FIG. 3 is an exemplary protocol stack representation of the adaptable cross-layer gateway according to one embodiment of the present invention.

FIG. 3 illustrates an Open Systems Interconnect (OSI) model of the gateway 12 showing the cross-layer implementation of the gateway 12 according to one embodiment of the present invention. The traditional OSI model allows communication and data exchange only between adjacent layers in the protocol stack. However, as illustrated in FIG. 3, the gateway 12 enables communication and data exchange between all layers, including non-adjacent layers, of the protocol stack. The connectivity of the various layers of the protocol stack is controlled by the gateway OS 56. More specifically, in this embodiment, the gateway OS 56 includes application clients 58-64, which are associated with corresponding applications such as, but not limited to, a File Transfer Protocol (FTP) application, an HTTP application, a Real-time Transfer Protocol (RTP) and RTP Control (RTPC) application, and a streaming MPEG application. The application clients 58-64 operate to control the connectivity of the various protocol stack layers, or adapt the cross-layering scheme, for transfers by the associated applications.

In this embodiment, the offload engine 30 corresponds to layers 2-4 of the illustrated protocol stack. In addition, as illustrated, numerous switches 66 provide interfaces between the various protocol stack layers. The switches 66 may be implemented in hardware or software. In one embodiment, the switches 66 are implemented as an internal bus of the offload engine 30.

As will be apparent to one having ordinary skill in the art upon reading this disclosure, the performance of the WLAN 16 can be significantly improved by using cross-layering techniques. By improving the performance of the WLAN 16, the WLAN 16 gains further advantage from the high bandwidth capabilities of the FTTH connection to the WAN 14. For example, cross-layering techniques may be used to remove, or bypass, layers such as the IP/IP Router layer (Layer 3) when transferring data between the user devices 22-28 in the WLAN 16. Further, when the gateway 12, or more specifically the associated application client 58-64, detects that a data transfer is between two of the user devices 22-28, the gateway 12 may establish a Layer 2 connection between the two user devices using the Ethernet Switch service. In either of these situations, the gateway 12 may notify associated cross-layer agents on the user devices 22-28 of the cross-layering technique used for transfers to the user devices 22-28.

As another example, if an incoming data transfer meets alternate transfer criteria, the gateway 12 may use cross-layering techniques to establish an alternate point-to-point wireless link between the gateway 12 and the particular one of the user devices 22-28 over an alternate wireless channel. The alternate wireless channel may be a wireless channel not used by the gateway 12 when performing normal access point functions. For example, the alternate wireless channel may be provided by a secondary wireless communication interface operating on a frequency channel that does not overlap with the primary wireless channels used by the gateway 12 for normal access point operation. An exemplary system that establishes alternate wireless channels based on alternate transfer criteria is disclosed in U.S. patent application Ser. No. 11/443,761, entitled SYSTEM AND METHOD FOR BYPASSING AN ACCESS POINT IN A LOCAL AREA NETWORK FOR P2P DATA TRANSFERS, filed May 31, 2006, which is hereby incorporated herein by reference in its entirety.

Figure 4:
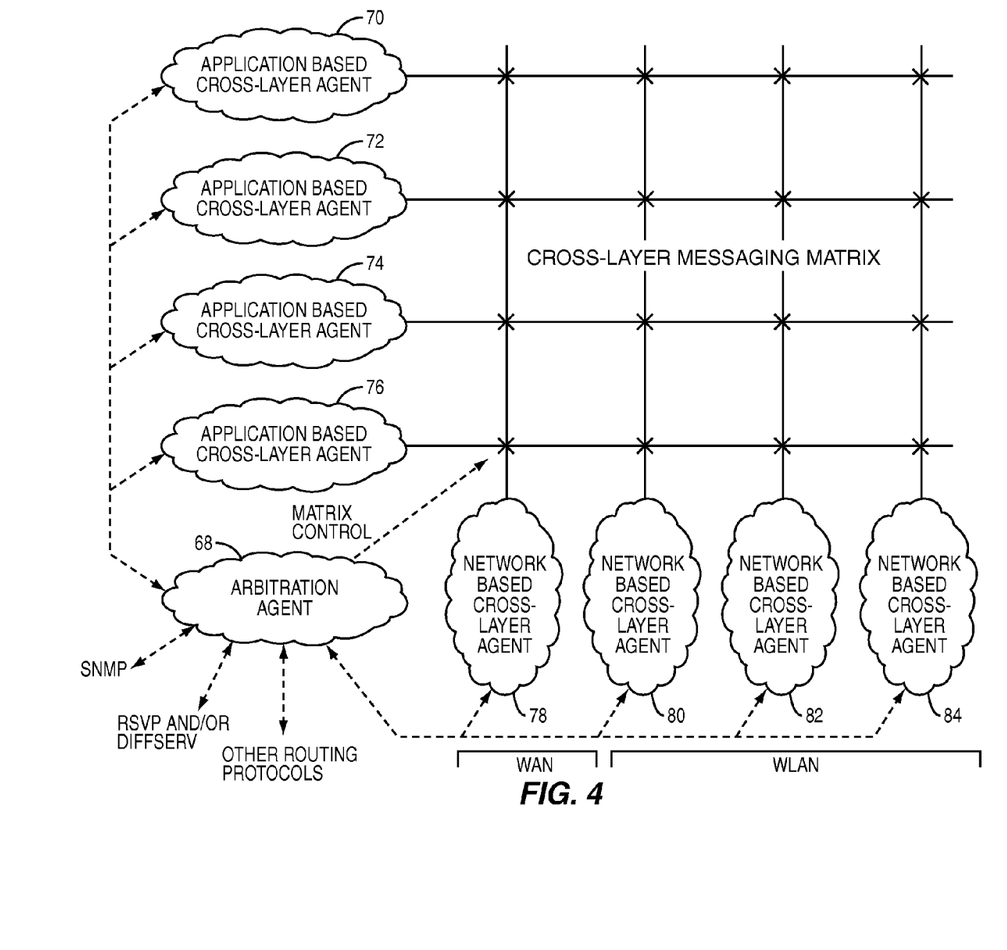
FIG. 4 illustrates an exemplary cross-messaging matrix controlled to provide a complete protocol stack having a cross-layer architecture for a network connection implemented by the adaptable cross-layer gateway according to one embodiment of the present invention.

FIG. 4 illustrates a cross-layer messaging matrix that may be implemented by the gateway 12 to control the interconnections of the various protocol stack layers illustrated in FIG. 5. For a detailed discussion of the cross-layer messaging matrix, the interested reader is referred to U.S. patent application Ser. No. 11/443,882, entitled CROSS-LAYER ARCHITECTURE FOR A NETWORK DEVICE, filed May 31, 2006, which is hereby incorporated herein by reference in its entirety.

In general, an arbitration agent 68 operates to associate application based cross-layer agents 70-76 with one or more network based cross-layer agents 78-84 and to interconnect various layers of the protocol stack as needed to provide a complete cross-layer protocol stack for a given network connection. The application based cross-layer agents 70-76 are preferably sub-components of the application clients 58-64 (FIG. 3), respectively. As such, each of the application based cross-layer agents 70-76 are associated with a particular application such as a FTP application, an HTTP application, a RTP/RTPC application, a streaming MPEG application, or the like. The network based cross-layer agents 78-84 are each associated with one of the wireless network interfaces 34, or radios 34, of the gateway 12. The network based cross-layer agents 78-84 provide or facilitate information-sharing between and control of the low level protocol stack layers. For example, the network based cross-layer agent 78 may provide or facilitate information sharing between and control of layers 1-4 for a first wireless network interface, or wireless radio, 34 of the gateway 12. Further, the network based cross-layer agent 78 may be associated with the application based cross-layer agents 70-76 by the arbitration agent 68 using the cross-layer messaging matrix to facilitate information sharing between and control of the low level protocol stack layers and the upper protocol stack layers when desired.

In operation, for example, if incoming data is to be transferred to the user device 22 within the WLAN 16 via the FTP application, the arbitration agent 68 may determine that a particular wireless network interface, or wireless radio, 34 of the gateway 12 is capable of or preferred for providing a network connection to the user device 22. Then, by controlling the cross-layer messaging matrix, the arbitration agent 68 operates to interconnect the FTP application to the wireless network interface, or wireless radio, 34 via the protocol stack of the gateway 12, and interconnect the application based cross-layer agent 70 associated with the FTP application and the network based cross-layer agent 78 associated with the wireless network interface, or wireless radio, 34 to provide a complete protocol stack having a cross-layer architecture for the network connection.

Those skilled in the art will recognize improvements and modifications to the preferred embodiments of the present invention. All such improvements and modifications are considered within the scope of the concepts disclosed herein and the claims that follow.

The invention claimed is:

1. A residential gateway within a customer premises interconnecting a Wide Area Network (WAN) external to the customer premises to a lower speed Wireless Local Area Network (WLAN) within the customer premises, the residential gateway comprising:
   an adaptable cross-layer offload engine;
   a data cache associated with the offload engine;
   a network interface communicatively coupling the offload engine to the WAN and providing a first data rate; and
   a wireless interface associated with the offload engine and adapted to communicate with a plurality of user devices within the WLAN, the interface providing a second data rate that is less than the first data rate of the network interface;
   wherein the offload engine is adapted to:
      receive incoming data from the WAN via the network interface at the first data rate;
      store the incoming data in the data cache; and
      transmit the incoming data from the data cache to a corresponding one of the plurality of user devices in the WLAN via the wireless interface at the second data rate;
   further wherein the gateway further comprises:
      a rule check engine adapted to inspect the incoming data from the WAN based upon at least one rule prior to transmitting the incoming data to the corresponding one of the plurality of user devices in the WLAN, the at least one rule comprises at least one Digital Rights Management (DRM) rule and the rule check engine operates to identify content comprising at least a portion of a media file to be processed by a DRM function and initiate the DRM function for the identified content; and
      a file format conversion function adapted to convert the identified content that is in a first viewable or playable file format to converted content in a second viewable or playable file format having lesser bandwidth requirements than the first file format;
   wherein the DRM function is initiated by the rule check engine based on the at least one DRM rule, the DRM function being adapted to:
      encrypt the converted content independent of any encryption of the incoming data transmitted over the WLAN, such that encrypted content is transmitted to the corresponding one of the plurality of user devices within the WLAN preventing unauthorized viewing or playing of the converted content via the corresponding one of the plurality of user devices, and
      provide license keys for decrypting the encrypted content to desired ones of the plurality of user devices having permission to view or play the converted content.

2. The gateway of claim 1 wherein the offload engine comprises a number of protocol stack layers from a protocol stack of the gateway and is implemented in a cross-layer architecture enabling direct communication between non-adjacent layers in the protocol stack.

3. The gateway of claim 1 wherein the network interface is coupled to the WAN via a Fiber-to-the-Home (FTTH) connection.

4. The gateway of claim 1 wherein the network interface operates according to one of the plurality of IEEE 802.11 standards.

5. The gateway of claim 1 wherein the first data rate provided by the network interface is at least 1 Gigabit per second (Gbps).

6. The gateway of claim 5 wherein the second data rate provided by the WLAN is less than or equal to 500 Megabits per second (Mbps).

7. The gateway of claim 1 wherein the rule check engine performs a stateful inspection of the incoming data.

8. The gateway of claim 1 wherein the rule check engine performs a stateless inspection of the incoming data.

9. The gateway of claim 1 wherein the at least one rule comprises at least one intrusion detection rule for detecting malicious network traffic.

10. The gateway of claim 1 wherein the at least one rule further comprises at least one content rule identifying a type of content to block from entering the WLAN.

11. The gateway of claim 1 wherein the conversion function adapted to convert the identified content corresponding to a media file having a first quality to a media file having a lesser quality, thereby reducing bandwidth requirements for transferring the media file over the WLAN.

12. The gateway of claim 1 wherein the rule check engine is further adapted to: inspect the incoming data to identify content in a specified file format; and initiate the file format conversion function adapted to convert the identified content to a new file format having lesser bandwidth requirements than the specified file format prior to transmission of the identified content over the WLAN.

13. The gateway of claim 1 wherein the rule check engine is further adapted to: inspect the incoming data to identify content corresponding to a media file in a specified file format; and initiate a conversion function adapted to reduce a quality of the media file prior to transmission of the identified content over the WLAN.

14. The gateway of claim 1 wherein the offload engine is further adapted to: receive outgoing data from one of the plurality of user devices within the WLAN at the second data rate provided by the wireless interface; buffer the outgoing data in the data cache; and transmit the outgoing data from the data cache to a desired end point via the network interface at the first data rate of the network interface.

15. The gateway of claim 14 wherein the rule check engine is further adapted to inspect the outgoing data to identify content comprising a related portion of the outgoing data desired to be encrypted prior to transmission over the WAN; and the DRM function is further adapted to encrypt the identified content comprising a portion of the outgoing data prior to transmission over the WAN to prevent unauthorized viewing or playing thereof.

16. A method of interconnecting a Wide Area Network (WAN) external to a customer premises and a lower speed Wireless Local Area Network (WLAN) within the customer premises via a residential gateway within the customer premises, the method comprising:
receiving incoming data from the WAN at a first data rate;
offloading the incoming data to a data cache;
inspecting the incoming data from the WAN based upon at least one Digital Rights Management (DRM) rule to identify content comprising at least a portion of a media file to be processed by a DRM function;
converting the media file that is in a first viewable or playable file format to converted content in a second viewable or playable file format having lesser bandwidth requirements than the first file format;
encrypting by the DRM function, the converted content independent of any encryption of the incoming data transmitted over the WLAN to provide encrypted content preventing unauthorized viewing or playing of the converted content;
transmitting the incoming data, including the encrypted content, from the data cache to a corresponding one of a plurality of user devices within the WLAN at a second data rate of the WLAN that is less than the first data rate of the WAN; and
providing license keys for decrypting the encrypted content to the corresponding one of the plurality of user devices if the corresponding one of the plurality of user devices has permission to view or play the encrypted content.

17. The method of claim 16 wherein transmitting the incoming data from the data cache comprises transmitting the incoming data from the data cache using a communications protocol stack comprising a number of protocol stack layers according to an adaptable cross-layering scheme enabling direct communication between non-adjacent layers in the protocol stack.

18. The method of claim 16 wherein receiving the incoming data comprises receiving the incoming data from the WAN via a Fiber-to-the-Home (FTTH) connection.

19. The method of claim 16 further comprising:
inspecting the incoming data to identify content in a specified file format;
converting the identified content to a new file format having lesser bandwidth requirements than the specified file format; and
transmitting the identified content in the new file format to the corresponding one of the plurality of user devices within the WLAN.

20. The method of claim 16 further comprising:
inspecting the incoming data to identify content corresponding to a media file in a specified file format;
reducing a quality of the media file, thereby reducing bandwidth requirements of the media file; and
transmitting the reduced quality media file to the corresponding one of the plurality of user devices in the WLAN.

* * * * *